United States Patent
Roux et al.

(10) Patent No.: US 12,304,854 B2
(45) Date of Patent: May 20, 2025

(54) PROCESS FOR DRYING WET GLASS FIBRE FORMING PACKAGES

(71) Applicant: Owens Corning Intellectual Capital, LLC, Toledo, OH (US)

(72) Inventors: Etienne Roux, Sonnaz (FR); Philippe Boissonnat, Challes les eaux (FR)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 18/631,162

(22) Filed: Apr. 10, 2024

(65) Prior Publication Data
US 2024/0254042 A1   Aug. 1, 2024

Related U.S. Application Data

(62) Division of application No. 17/641,163, filed as application No. PCT/EP2020/076602 on Sep. 23, 2020, now Pat. No. 11,981,599.

(30) Foreign Application Priority Data

Sep. 27, 2019 (EP) .................................... 19290095

(51) Int. Cl.
   C03C 25/64     (2006.01)
   C03B 37/02     (2006.01)
   C03C 25/002    (2018.01)
   C03C 25/12     (2006.01)

(52) U.S. Cl.
   CPC ............. C03C 25/64 (2013.01); C03B 37/02 (2013.01); C03C 25/002 (2013.01); C03C 25/12 (2013.01)

(58) Field of Classification Search
   CPC ............ C03C 25/002; C03C 25/10–54; C03C 25/24–40; C03C 25/64; B28B 11/241
   See application file for complete search history.

(56) References Cited

U.S. PATENT DOCUMENTS

| | | |
|---|---|---|
| 3,619,252 A | 11/1971 | Roscher |
| 3,619,538 A | 11/1971 | Kallenborn et al. |
| 3,653,860 A | 4/1972 | Smith et al. |
| 3,717,448 A | 2/1973 | Smith |
| 3,740,257 A | 6/1973 | Roscher |
| 3,876,405 A | 4/1975 | Eilerman |

(Continued)

FOREIGN PATENT DOCUMENTS

| | | |
|---|---|---|
| CN | 201772698 U | 3/2011 |
| CN | 102353238 A | 2/2012 |

(Continued)

OTHER PUBLICATIONS

Basak, T., & Priya, A. S. (2005). Role of metallic and ceramic supports on enhanced microwave heating processes. Chemical engineering science, 60(10), 2661-2677. (Year: 2005).

(Continued)

*Primary Examiner* — Erin Snelting
(74) *Attorney, Agent, or Firm* — Calfee, Halter & Griswold LLP (57) ABSTRACT

Herein is described a process for drying wet glass fibre forming packages, the process comprising: providing a wet glass fibre forming package comprising a strand of glass fibres with an aqueous sizing applied to the glass fibres; and subjecting the wet glass fibre forming package to microwave radiation having a frequency in the range of about 750 to about 1050 MHz.

12 Claims, 4 Drawing Sheets

(56) References Cited

U.S. PATENT DOCUMENTS

| | | |
|---|---|---|
| 4,074,988 A | 2/1978 | Eilerman et al. |
| 4,218,830 A | 8/1980 | Grassmann |
| 4,351,752 A | 9/1982 | Das et al. |
| 4,701,345 A | 10/1987 | Giatras et al. |
| 5,779,758 A | 7/1998 | Mann et al. |
| 9,126,869 B1 | 9/2015 | Yamayose |
| 2005/0082721 A1 | 4/2005 | Haque et al. |
| 2007/0154639 A1 | 7/2007 | Malinger et al. |
| 2007/0207273 A1 | 9/2007 | English et al. |
| 2008/0160286 A1 | 7/2008 | Asrar et al. |
| 2008/0289211 A1 | 11/2008 | Pinkham, Jr. et al. |
| 2009/0305864 A1 | 12/2009 | Richter et al. |
| 2010/0273375 A1 | 10/2010 | Teschner et al. |
| 2011/0272621 A1 | 11/2011 | Jaffrennou et al. |
| 2013/0165548 A1 | 6/2013 | Tadepalli et al. |
| 2016/0288364 A1 | 10/2016 | Kato et al. |

FOREIGN PATENT DOCUMENTS

| | | |
|---|---|---|
| CN | 103587130 A | 2/2014 |
| CN | 104075552 A | 10/2014 |
| CN | 104374175 A | 2/2015 |
| CN | 206919638 U | 1/2018 |
| CN | 109311755 A | 2/2019 |
| DE | 19818046 A1 | 10/1999 |
| DE | 202006011686 U1 | 11/2006 |
| DE | 202007014370 U1 | 4/2008 |
| EP | 0027942 A1 | 5/1981 |
| EP | 1995538 A2 | 11/2008 |
| FR | 1579734 A | 8/1969 |
| GB | 1346270 A | 2/1974 |
| JP | 2016217679 A | 12/2016 |
| WO | 9321124 A1 | 10/1993 |
| WO | 2010060538 A1 | 6/2010 |
| WO | 2019124033 A1 | 6/2019 |

OTHER PUBLICATIONS

Extended European Search Report from EP Application No. 19290095.9 dated May 6, 2020.
International Search Report and Written Opinion from PCT/EP2020/076602 dated Nov. 18, 2020.
Office Action from EA Application No. 202291006 dated Dec. 21, 2022.
Office Action from CN Application No. 202080068208.0 dated Aug. 25, 2023.
Office Action from CN Application No. 202080068208.0 dated Mar. 29, 2023.
Office Action from U.S. Appl. No. 17/641,163 dated May 5, 2023.
Office Action from U.S. Appl. No. 17/641,163 dated Aug. 7, 2023.
Office Action from U.S. Appl. No. 17/641,163 dated Oct. 31, 2023.
Notice of Allowance from U.S. Appl. No. 17/641,163 dated Jan. 29, 2024.

PROCESS FOR DRYING WET GLASS FIBRE FORMING PACKAGES

CROSS-REFERENCE TO RELATED APPLICATIONS

This application is a divisional of U.S. application Ser. No. 17/641,163, filed Mar. 8, 2022, which is the U.S. national stage entry of International Application No. PCT/EP2020/076602, filed Sep. 23, 2020, which claims priority to and the benefit of European Application No. 19290095.9, filed Sep. 27, 2019, the entire contents of which are incorporated by reference herein.

FIELD OF THE INVENTION

The present invention relates to drying wet glass fibre forming packages, in particular drying a wet glass fibre forming package comprising a glass fibre strand with an aqueous sizing applied to the glass fibres, for example to provide a dry glass fibre forming package comprising a dried glass fibre strand.

BACKGROUND

Glass fibres are produced by extruding molten glass through bushings, the fibres extruded from the bushings are then coated with a sizing, such as an aqueous sizing, to form sized glass fibres. The sized glass fibres may then be bundled into strands (a strand comprising a plurality of sized glass fibres). A strand, or multiple strands, may then be wound onto a forming package bobbin to form a wet glass fibre forming package. The aqueous sizing of the glass fibres of the wet glass fibre forming package is then dried to remove water to form the aqueous sizing, and then may be cured to form a dried glass fibre forming package.

Conventionally, wet glass fibre forming packages are dried using hot air in an oven, for example at a temperature of around 50-150° C. for many hours (e.g. around 20 hours). Exposure to elevated temperature dries the sizing and may also be used to cure the dried sizing composition.

U.S. Pat. No. 3,717,448 describes microwaving drying of sized glass fibres. Previous attempts at microwave drying of sized glass fibres has been carried out using conventional microwave drying frequencies of around 2.45 GHz.

SUMMARY OF THE INVENTION

At its most general, the present invention provides a process for drying a wet glass fibre forming package comprising a strand of glass fibres with an aqueous sizing applied to the glass fibres, the process comprising subjecting the wet glass fibre forming package to microwave radiation of a frequency lower than 2.45 GHZ. In embodiments, the microwave radiation has a frequency in the range of about 750 to about 1050 MHZ, for example about 915 MHz.

In a first aspect, the present invention provides a process for drying a wet glass fibre forming package, the process comprising:
  providing a wet glass fibre forming package comprising a strand of glass fibres, the glass fibres including an aqueous sizing; and
  subjecting the wet glass fibre forming package to microwave radiation having a frequency in the range of about 750 to about 1050 MHz.

The present inventors have found that drying of glass fibre strands by such a process may provide certain advantages, such as quicker drying time compared to conventional hot air drying and/or improved radiation penetration into the forming package when compared to higher frequency microwave radiation. As a result, the dried glass fibre strands may have certain improved properties when compared to, for example, conventional air drying, such as improved homogeneity of their sizing, improved appearance due to reduced colouration of the sizing, improved processability, as well as improved mechanical properties. The present inventors have also found that this process also allows standard metallic supports (for supporting the wet glass fibre forming packages during drying) to be employed.

In a second aspect, the present invention provides a wet glass fibre forming package processing system. The wet glass fibre forming package processing system may comprise:
  a glass fibre producing apparatus comprising a bushing for extruding glass fibres;
  an aqueous sizing composition applicator for applying an aqueous sizing composition to glass fibres extruded from the bushing to form sized glass fibres;
  a strand forming device for forming a glass fibre strand from the sized glass fibres;
  a winding device to form a wet glass fibre forming package from the glass fibre strand; and
  a microwave drier configured to dry the wet glass fibre forming package by subjecting the wet glass fibre forming package to microwave radiation having a frequency in the range of about 750 to about 1050 MHz.

The invention includes the combination of the aspects and preferred features described herein except where such a combination is clearly impermissible or expressly avoided.

BRIEF DESCRIPTION OF THE FIGURES

Embodiments and experiments illustrating the principles of the invention will now be discussed with reference to the accompanying figures in which.

DETAILED DESCRIPTION

Aspects and embodiments of the present invention will now be discussed with reference to the accompanying figures. Further aspects and embodiments will be apparent to those skilled in the art. All documents mentioned in this text are incorporated herein by reference.

The present invention provides a process for drying a wet glass fibre forming package, the wet glass fibre forming package comprising a strand of glass fibres with an aqueous sizing applied to the glass fibres. As used herein, the term "drying" refers to reducing the water content of the aqueous sizing applied to the glass fibres. Terms such as "dried glass fibre forming package", "dried glass fibre(s)", or "dried glass fibre strand" refer to a wet forming package, fibre(s) or strand which has reduced water content, i.e. reduced water content of the sizing composition applied to the glass fibres, compared to the water content of the wet forming package, fibre(s) or strand before drying. Terms such as "wet glass fibre forming package", "wet glass fibre(s)", or "wet glass fibre strand" refer to a wet forming package, fibre(s) or strand comprising glass fibres with an aqueous sizing applied to the glass fibres before the aqueous sizing has been subjected to drying conditions. In some embodiments, the terms "dried glass fibre forming package", "dried glass fibre(s)", or "dried glass fibre strand" comprise less than about 10% by weight of the water content of the wet forming package, fibre(s) or strand, for example less than about 5%, or less than about 1% by weight of the water content of the wet forming package, fibre(s) or strand.

The terms "dried glass fibre forming package", "dried glass fibre(s)", or "dried glass fibre strand" may refer to a glass fibre forming package, glass fibre(s) or glass fibre strand having a water content of less than about 5 wt. % of the glass fibre forming package, glass fibre(s) or glass fibre strand, for example less than about 1 wt. %, less than about 0.5 wt. %, or less than about 0.1 wt. % of the glass fibre forming package, glass fibre(s) or glass fibre strand.

Drying Using Microwave Radiation

The process for drying a wet glass fibre forming package comprises subjecting the wet glass fibre forming package to microwave radiation with a frequency of less than 2.45 GHZ. In some embodiments, the microwave radiation to which the wet glass fibre forming package is subjected in order to dry the wet glass fibre forming package has a frequency in the range of about 750 MHz to about 1050 MHz, for example about 800 MHz to about 1000 MHz, about 850 MHz to about 950 MHz, about 875 MHz to about 950 MHz, about 900 MHz to about 950 MHz, about 900 MHz to about 930 MHz, about 910 MHz to about 920 MHz, or about 915 MHz.

In some embodiments, the process for drying a wet glass fibre forming package comprises subjecting the wet glass fibre forming package to microwave radiation for a time period of at least about 10 mins, for example at least about 15 mins, at least about 30 mins, at least about 45 mins, at least about 60 mins (about 1 hour), at least about 75 mins or at least about 90 mins. For example, the process for drying a wet glass fibre forming package may comprise subjecting the wet glass fibre forming package to microwave radiation having a frequency in the range of about 750 MHz to about 1050 MHZ, for example about 800 MHz to about 1000 MHz, about 850 MHz to about 950 MHZ, about 875 MHz to about 950 MHZ, about 900 MHz to about 950 MHz, about 900 MHz to about 930 MHz, about 910 MHz to about 920 MHz, or about 915 MHz, for a time period of at least about 10 mins, for example at least about 15 mins, at least about 30 mins, at least about 45 mins, at least about 60 mins (about 1 hour), at least about 75 mins or at least about 90 mins.

In some embodiments, the process for drying a wet glass fibre forming package comprises subjecting the wet glass fibre forming package to microwave radiation for a time period of up to about 5 hours, for example up to about 4 hours or up to about 3 hours. For example, the process for drying a wet glass fibre forming package may comprise subjecting the wet glass fibre forming package to microwave radiation having a frequency in the range of about 750 MHz to about 1050 MHZ, for example about 800 MHz to about 1000 MHz, about 850 MHz to about 950 MHZ, about 875 MHz to about 950 MHz, about 900 MHz to about 950 MHz, about 900 MHz to about 930 MHz, about 910 MHz to about 920 MHz, or about 915 MHZ, for a time period of up to about 5 hours, for example up to about 4 hours or up to about 3 hours.

In some embodiments, the process for drying a wet glass fibre forming package comprises subjecting the wet glass fibre forming package to microwave radiation for a time period of in the range of about 10 mins to about 5 hours, for example about 15 mins to about 4 hours, about 30 mins to about 3 hours, about 45 mins to about 3 hours, about 60 mins (about 1 hour) to about 3 hours, about 75 mins to about 3 hours, or about 90 mins to about 3 hours. For example, the process for drying a wet glass fibre forming package may comprise subjecting the wet glass fibre forming package to microwave radiation having a frequency in the range of about 750 MHz to about 1050 MHZ, for example about 800 MHz to about 1000 MHz, about 850 MHz to about 950 MHz, about 875 MHz to about 950 MHz, about 900 MHz to about 950 MHz, about 900 MHz to about 930 MHz, about 910 MHz to about 920 MHz, or about 915 MHZ, for a time period of in the range of about 10 mins to about 5 hours, for example about 15 mins to about 4 hours, about 30 mins to about 3 hours, about 45 mins to about 3 hours, about 60 mins (about 1 hour) to about 3 hours, about 75 mins to about 3 hours, or about 90 mins to about 3 hours.

In some embodiments, the process for drying a wet glass fibre forming package comprises subjecting the wet glass fibre forming package to microwave radiation having a power of at least about 10 W/kg wet glass fibre forming package, for example at least about 20 W/kg wet glass fibre forming package, at least about 30 W/kg wet glass fibre forming package, at least about 40 W/kg wet glass fibre forming package, at least about 50 W/kg wet glass fibre forming package, or about 50 W/kg wet glass fibre forming package. In some embodiments, the microwave radiation has a power of at least about 10 W/kg wet glass fibre forming package, for example at least about 20 W/kg wet glass fibre forming package, at least about 30 W/kg wet glass fibre forming package, at least about 40 W/kg wet glass fibre forming package, at least about 50 W/kg wet glass fibre forming package; or about 50 W/kg wet glass fibre forming package and the wet glass fibre forming package is subjected to microwave radiation for a time period of at least about 10 mins, for example at least about 30 mins, at least about 1 hour, about 10 mins to about 5 hours, about 15 mins to about 4 hours, or about 30 mins to about 3 hours.

In some embodiments, the process for drying a wet glass fibre forming package comprises subjecting the wet glass fibre forming package to microwave radiation having a power of up to about 300 W/kg wet glass fibre forming package, for example up to about 200 W/kg wet glass fibre forming package, up to about 150 W/kg wet glass fibre forming package, up to about 100 W/kg wet glass fibre forming package, or up to about 50 W/kg wet glass fibre forming package. In some embodiments, the microwave radiation has a power of up to about 300 W/kg wet glass fibre forming package, for example up to about 200 W/kg wet glass fibre forming package, up to about 150 W/kg wet glass fibre forming package, up to about 100 W/kg wet glass fibre forming package, or up to about 50 W/kg wet glass fibre forming package; and the wet glass fibre forming package is subjected to microwave radiation for a time period of at least about 10 mins, for example at least about 30 mins, at least about 1 hour, about 10 mins to about 5 hours, about 15 mins to about 4 hours, or about 30 mins to about 3 hours.

In some embodiments, the process for drying a wet glass fibre forming package comprises subjecting the wet glass fibre forming package to microwave radiation having a power in the range of about 10 to about 300 W/kg wet glass fibre forming package, for example about 20 to about 200 W/kg wet glass fibre forming package, about 30 to about 150 W/kg wet glass fibre forming package, or about 50 to about 100 W/kg wet glass fibre forming package. In some embodiments, the microwave radiation has a power in the range of about 10 to about 300 W/kg wet glass fibre forming package, for example about 20 to about 200 W/kg wet glass fibre forming package, about 30 to about 150 W/kg wet glass fibre forming package, or about 50 to about 100 W/kg wet glass fibre forming package; and the wet glass fibre forming package is subjected to microwave radiation for a time period of at least about 10 mins, for example at least about 30 mins, at least about 1 hour, about 10 mins to about 5 hours, about 15 mins to about 4 hours, or about 30 mins to about 3 hours.

In some embodiments, the process for drying a wet glass fibre forming package comprises subjecting the wet glass fibre forming package to microwave radiation having a frequency on the range of about 750 to about 1050 MHz until the water content of the glass fibre forming package (e.g. the water content of the aqueous sizing applied to the glass fibres of the glass fibre forming package) is reduced by at least about 80% by weight, for example reduced by at least about 90%, at least about 95%, or at least about 99% by weight compared to the water content of the wet glass fibre forming package (e.g. the water content of the aqueous sizing applied to the glass fibres of the wet glass fibre forming package) before the wet glass fibre forming package is subjected to microwave radiation having a frequency on the range of about 750 to about 1050 MHZ.

In some embodiments, the process for drying a wet glass fibre forming package comprises subjecting the wet glass fibre forming package to microwave radiation having a frequency on the range of about 750 to about 1050 MHz until the water content of the glass fibre forming package (e.g. the water content of the aqueous sizing applied to the glass fibres of the glass fibre forming package) is less than about 10% of the water content of the wet glass fibre forming package by weight, for example less than about 5%, or less than about 1% of the water content of the wet glass fibre forming package by weight.

In some embodiments, the process for drying a wet glass fibre forming package comprises subjecting the wet glass fibre forming package to microwave radiation having a frequency on the range of about 750 to about 1050 MHz until the glass fibre forming package has a water content (e.g. the aqueous sizing applied to the glass fibres of the glass fibre forming package has a water content) of less than about 5 wt. % of the glass fibre forming package, for example less than about 1 wt. %, less than about 0.5 wt. %, or less than about 0.1 wt. % of the glass fibre forming package.

In some embodiments, drying a wet glass fibre forming package consists of or consists essentially of subjecting the wet glass fibre forming package to microwave radiation as described herein. In some embodiments, drying a wet glass fibre forming package consists of or consists essentially of subjecting the wet glass fibre forming package to microwave radiation as described herein without subjecting the wet glass fibre forming package to hot air drying. In some embodiments, drying a wet glass fibre forming package comprises subjecting the wet glass fibre package to microwave radiation and hot air, for example subjecting the wet glass fibre package to microwave radiation and hot air simultaneously.

In some embodiments, the wet glass fibre forming package is supported by a metal spindle when the wet glass fibre forming package is subjected to microwave radiation having a frequency in the range of about 750 MHz to about 1050 MHz. The metal spindle may penetrate a central cavity in the forming package to support the wet glass fibre forming package. In certain embodiments, the metal spindle is a steel spindle. In other embodiments, the metal spindle includes a magnetic metal. The process described herein may include a step of loading the wet glass fibre forming package onto a metal spindle before subjecting the wet glass fibre forming package to microwave radiation having a frequency in the range of about 750 MHz to about 1050 MHZ. In other embodiments, the process includes a step of forming the wet glass fibre forming package by winding glass fibre with an aqueous sizing onto a forming package bobbin supported by a metal spindle.

In some embodiments, the wet glass fibre forming package may be in motion when being subjected to microwave radiation having a frequency in the range of about 750 MHz to about 1050 MHz. Motion of the wet glass fibre forming package while microwave radiation is applied to the forming package may assist with homogenous drying of the forming package. The motion may be translational motion and/or rotational motion. For example, the wet glass fibre forming package may be moved from one position within a drying cavity to another position within a drying cavity while the wet glass fibre forming package is subjected to microwave radiation as described herein. The wet glass fibre forming package may be moved on any suitable transit device, such as a conveyor belt or may be held on a movable support such as metal conveyor. The wet glass fibre forming package may be rotated while the wet glass fibre forming package is subjected to microwave radiation as described herein. For example, the wet glass fibre forming package may be held by a rotatable support.

Curing

In some embodiments, the process described herein further comprises a step of curing the aqueous sizing, for example to form a cured sizing. In some embodiments, the process described herein further comprises a step of curing the sizing of the glass fibre forming package after the glass fibre forming package has been subjected to microwave radiation as described herein. In other words, the process may include a step of curing the sizing of the glass fibre forming package after the glass fibre forming package has been dried.

In some embodiments, curing comprises subjecting the glass fibre forming package to elevated temperature after the glass fibre forming package has been subjected to the microwave radiation. Curing may comprise subjecting the glass fibre forming package to elevated temperature by subjecting the glass fibre forming package to gas (such as air), the gas being at an elevated temperature.

In some embodiments, curing comprises subjecting the glass fibre forming package to a temperature of at least about 50° C., for example at least about 75° C., at least about 100° C., at least about 110° C., at least about 120° C., or about 130° C. or greater. In some embodiments, curing comprises subjecting the glass fibre forming package to a temperature in the range of about 50° C. to about 200° C., for example about 75° C. to about 180° C., about 100° C. to about 175° C., about 100° C. to about 150° C., about 110° C. to about 150° C., about 120° C. to about 150° C., about 120° C. to about 140° C., about 130° C. to about 140° C. or about 130° C.

In some embodiments, curing comprises subjecting the glass fibre forming package to elevated temperature for a time period of at least about 1 hour, for example at least about 2 hours, at least about 3 hours, at least about 5 hours, at least about 7 hours, or at least about 8 hours. In some embodiments, curing comprises subjecting the glass fibre forming package to elevated temperature for a time period of up to about 20 hours. In some embodiments, curing comprises subjecting the glass fibre forming package to elevated temperature for a time period in the range of about 1 hour to about 20 hours, for example about 5 hours to about 20 hours, or about 8 hours to about 20 hours.

In some embodiments, curing comprises subjecting the glass fibre forming package to a temperature of at least about 50° C., for example at least about 75° C., at least about 100° C., at least about 110° C., at least about 120° C., or about 130° C. or greater for a time period of at least about 1 hour, for example at least about 5 hours, or a time period in the range of about 1 hour to about 20 hours, for example about 5 hours to about 20 hours, or about 8 hours to about 20 hours.

In some embodiments, curing comprises subjecting the glass fibre forming package to a temperature in the range of about 50° C. to about 200° C., for example about 75° C. to about 180° C., about 100° C. to about 175° C., about 100° C. to about 150° C., about 110° C. to about 150° C., about 120° C. to about 150° C., about 120° C. to about 140° C., about 130° C. to about 140° C. or about 130° C., for a time period of at least about 1 hour, for example at least about 5 hours, or a time period in the range of about 1 hour to about 20 hours, for example about 5 hours to about 20 hours, or about 8 hours to about 20 hours.

In some embodiments, curing includes subjecting the glass fibre forming package to microwave radiation of frequency lower than 2.45 GHz as described herein. In these embodiments, the microwave radiation to which the glass fibre forming package is subjected in order to cure the sizing has a frequency in the range of about 750 MHz to about 1050 MHZ, for example about 800 MHz to about 1000 MHz, about 850 MHz to about 950 MHZ, about 875 MHz to about 950 MHz, about 900 MHz to about 950 MHz, about 900 MHz to about 930 MHZ, about 910 MHz to about 920 MHz, or about 915 MHz. In certain embodiments, curing comprises a combination of subjecting the glass fibre forming package to elevated temperature after the glass fibre forming package has been subjected to the microwave radiation and subjecting the glass fibre forming package to microwave radiation of frequency lower than 2.45 GHz (e.g. a frequency in the range of about 750 MHz to about 1050 MHZ) as described herein. In some embodiments, subjecting the glass fibre forming package to elevated temperature and to microwave radiation of frequency lower than 2.45 GHZ (e.g. a frequency in the range of about 750 MHz to about 1050 MHZ) occurs concurrently.

In other embodiments, curing of the sizing occurs in the absence of microwave radiation.

Glass Fibre Forming Packages

As described herein, a wet glass fibre forming package comprises a strand of glass fibres with an aqueous sizing applied to the glass fibres.

A wet glass fibre forming package may be produced by firstly extruding molten glass through bushings to form glass fibres. The glass fibres extruded from the bushings are then coated with an aqueous sizing, to form sized glass fibres. A strand of glass fibres (i.e. a strand of glass fibres with an aqueous sizing applied to the glass fibres) may then be formed, for example by bundling together a plurality of sized glass fibres. A strand, for example a single continuous strand, may then wound onto a forming package bobbin (for example, the forming package bobbin may comprise, consist of, or consist essentially of a sleeve, for example a cylindrical sleeve, e.g. a cardboard sleeve or a plastic sleeve) to form a wet glass fibre forming package. In some embodiments, multiple strands may be wound onto a forming package bobbin to form a glass fibre forming package. The aqueous sizing of the glass fibres of the wet glass fibre forming package may then be dried as described herein. The sizing of the glass fibre forming package may then be cured as described herein.

In some embodiments, the wet glass fibre forming package has a mass of at least about 10 kg, for example at least about 15 kg, at least about 20 kg, or at least about 25 kg. In some embodiments, the wet glass fibre forming package has a mass up to about 50 kg, for example up to about 45 kg, up to about 40 kg, up to about 35 kg, up to about 30 kg, or a mass of about 25 kg. In some embodiments, the wet glass fibre forming package has a mass in the range of about 10-50 kg, for example about 15-45 kg, about 20-40 kg, or about 20-30 kg. In some embodiments, the mass of the glass fibres and the aqueous sizing applied thereto makes up at least about 80 wt. % of the wet glass fibre forming package (e.g. with the forming package bobbin making up the remaining balance), for example at least about 90 wt. %, or at least about 95 wt. % of the wet glass fibre forming package.

The wet glass fibre forming package may have a cylindrical shape.

In some embodiments, the wet glass fibre forming package has an internal diameter of at least about 5 cm, for example at least about 10 cm, or at least about 15 cm. In some embodiments, the wet glass fibre forming package has an internal diameter of up to about 20 cm, for example up to about 15 cm. In some embodiments, the wet glass fibre forming package has an internal diameter in the range of about 5 cm to about 20 cm, for example about 10 cm to about 15 cm. The "internal diameter" may be the diameter of a hollow core of the forming package bobbin onto which a glass fibre is wound to provide a wet glass fibre forming package.

In some embodiments, the wet glass fibre forming package has an external diameter of at least about 20 cm, for example at least about 25 cm, or at least about 30 cm. In some embodiments, the wet glass fibre forming package has an external diameter of up to about 60 cm, for example up to about 50 cm, or up to about 40 cm. In some embodiments, the wet glass fibre forming package has an external diameter in the range of about 20 cm to about 60 cm, for example about 30 cm to about 50 cm. The "external diameter" may be defined as the diameter measured to the outer most layer of glass fibre of the wet glass fibre forming package.

In some embodiments, the wet glass fibre forming package has an internal diameter in the range of about 5 cm to about 20 cm, for example about 10 cm to about 15 cm; and an external diameter in the range of about 20 cm to about 60 cm, for example about 30 cm to about 50 cm.

Glass Fibres

As described herein, a wet glass fibre forming package comprises a strand of glass fibres with an aqueous sizing applied to the glass fibres. The glass fibres to which the aqueous sizing is applied can be any type of glass fibres. For example, the glass fibres may be formed from E-glass, E-CR-glass, R-glass, C-glass, A-glass, D-glass, S-glass or H-glass.

Aqueous Sizing

As described herein, a wet glass fibre forming package comprises a strand of glass fibres with an aqueous sizing applied to the glass fibres. Sizes are applied to glass fibres in order to protect the glass fibres and may be used to improve adhesion between glass fibres and resins employed in composite materials.

An aqueous sizing may comprise a coupling agent and a film former. In some embodiments, an aqueous sizing comprises a coupling agent, a film former and a lubricant. In some embodiments, additional additives such as antistatic compounds, emulsifiers, anti-foaming compounds and/or bactericides may be added to the aqueous sizing. A coupling agent may provide adhesion between the surface of a glass fibre and resin of a composite material in which the glass fibre may be employed. Examples of coupling agents include silanes. A film former may be provided to protect the glass fibres and may also improve compatibility between the glass fibres and a resin employed in a composite material comprising the glass fibres. Examples of film formers are resins such as epoxy resins, polyester resins, and vinylester resins. A lubricant may be provided to provide lubrication in order to protect the glass fibres during processing. In some embodiments, an aqueous sizing may comprise 5-15 wt. % silane, 50-70 wt. % film former and 10-30 wt. % lubricant by total solids of the sizing composition (i.e. solids remaining after drying to remove water from the aqueous sizing composition).

Wet Glass Fibre Forming Package Processing System

Described herein is a wet glass fibre forming package processing system comprising:
- a glass fibre producing apparatus comprising a bushing for extruding glass fibres;
- an aqueous sizing applicator for applying an aqueous sizing to glass fibres extruded from the bushing to form sized glass fibres;
- a strand forming device for forming a glass fibre strand from the sized glass fibres;
- a winding device to form a wet glass fibre forming package from the glass fibre strand; and
- a microwave drier configured to dry the wet glass fibre forming package by subjecting the wet glass fibre forming package to microwave radiation having a frequency in the range of about 750 to about 1050 MHz.

Figure 1:
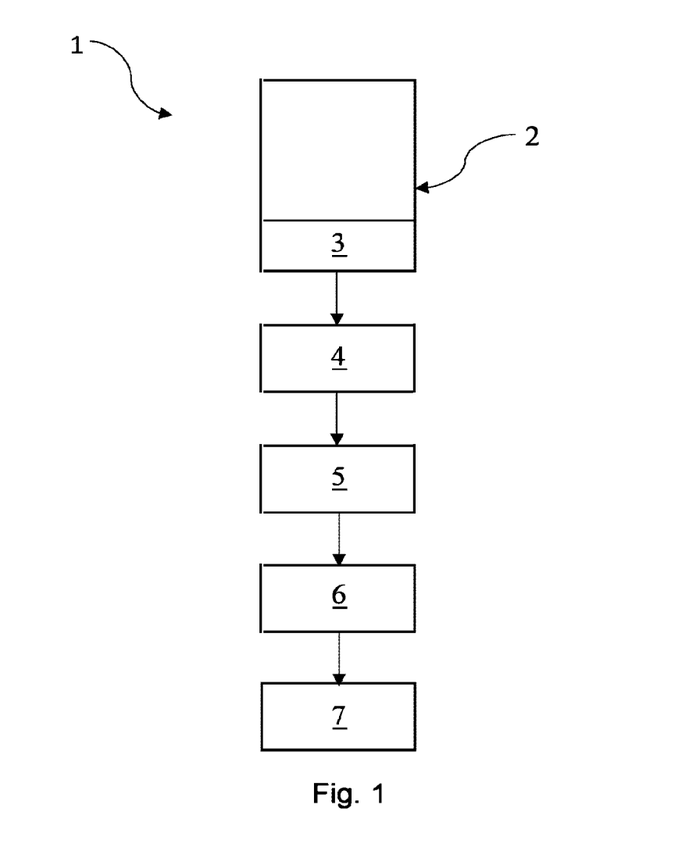
FIG. 1 shows a schematic diagram of a wet glass fibre forming package processing system.

FIG. 1 provides a schematic illustration of a wet glass fibre forming package processing system 1. The system 1 comprises a glass fibre producing apparatus 2 comprising a bushing 3 for extruding glass fibres. Glass fibres extruded from the bushing 3 of the glass fibre producing apparatus 2 may be transferred to or passed through an aqueous sizing applicator 4 which may apply an aqueous sizing to the glass fibres extruded from the bushing 3 to form sized glass fibres. Sized glass fibres may then be transferred to a strand forming device 5 to form a glass fibre strand from the sized glass fibres, and then the glass fibre strand may be transferred to a winding device 6 to form a wet glass fibre forming package from the glass fibre strand, for example by winding the glass fibre strand onto a forming package bobbin. The produced wet glass fibre forming package may then be transferred to a microwave drier 7. In some embodiments, the system 1 further comprises an oven, for example a hot air oven.

In some embodiments, the microwave drier may be a microwave oven configured to produce microwave radiation having a frequency in the range of about 750 to about 1050 MHz.

In some embodiments, the system further comprises an oven, for example a hot air oven, for subjecting the wet glass fibre forming package to elevated temperature to cure the aqueous sizing of the wet glass fibre forming package.

In some embodiments, the system further comprises an oven, for example a hot air oven, for subjecting the glass fibre forming package to elevated temperature to cure the glass fibre forming package (e.g. to cure the dried aqueous sizing of the glass fibre forming package).

In some embodiments, the oven, e.g. hot air oven, is configured to subject the glass fibre forming package to the temperatures described herein to cure the aqueous sizing of the glass fibre forming package.

In some embodiments, the system comprises an oven configured to provide microwave radiation as described herein and also to provide elevated temperatures as described herein. In some embodiments, the system comprises an oven configured to provide microwave radiation as described herein and also to provide elevated temperatures as described herein, wherein the oven is configured to subject a wet glass fibre forming package to microwave radiation before subjecting the glass fibre forming package to elevated temperature.

Further Processing

The dry glass fibre forming package may be packaged, e.g. for shipping. Alternatively dry glass fibre forming package may be processed further into one or more products such as chopped fibre, roving or yarn.

In some embodiments, the dry glass fibre forming package is processed into roving. In certain embodiments, the dry glass fibre forming package is processed into multi-end roving or single-end roving. In particular embodiments, the dry glass fibre forming package is processed into multi-end roving or single-end roving.

In some embodiments, the glass fibre forming package may take the form of a glass fibre cake or glass fibre bobbin.

EXAMPLES

The following illustrates examples of the processes and related aspects described herein. Thus, these examples should not be considered to restrict the present disclosure, but are merely in place to teach how to carry out the processes and obtain the products of the present disclosure.

Wet glass fibre forming packages were provided by winding a strand of sized glass fibres (sized with an aqueous sizing) onto a forming package bobbin (having an internal diameter of 165 mm). All of the glass fibre forming packages were formed using E-CR glass (Advantex™). The tex of the sized glass fibre (sized using an aqueous sizing composition, for example an aqueous sizing composition as described above) strands used to produce six different types of wet glass fibre forming packages are detailed in table 1 below along with the total weight of the glass fibre forming packages after drying (dry pack weight). The produced wet glass fibre forming packages had a moisture content (by total weight of the undried glass fibre) in the range of 8-12%. The produced wet glass fibre forming packages has an external diameter in the range of 300-390 mm.

TABLE 1

Glass Fibre Forming packages

| Glass Fibre Forming package | Tex of glass fibre strand (g/km) | Dry pack weight (kg) |
|---|---|---|
| Example 1 (undried SE4849*) | 2400 | 26.3 |
| Example 2 (undried PS4100*) | 9600 | 23.8 |
| Example 3 (undried PS4100*) | 4800 | 23.6 |
| Example 4 (undried WS2000*) | 1200 | 25.7 |
| Example 5 (undried R25H*) | 2400 | 25.9 |
| Example 6 (undried R25H*) | 600 | 33.4 |

*SE4849, PS4100, WS2000 and R25H refer to sized glass fibre products available from Owens Corning.

Testing
Comparing Subjecting Wet Glass Fibre Forming Packages to Microwave Radiation Having a Frequency in the Range of about 750 to about 150 MHZ, e.g 915 MHz, to Subjecting Wet Glass Fibre Forming Packages to Conventional Microwave Drying Frequencies (i.e. about 2.45 GHZ)

Before drying, wet glass fibre forming packages are conventionally loaded onto supports before being placed in an oven, e.g. hot air oven. Standard supports are metallic, e.g. stainless steel supports or magnetic steels supports. It is desirable to use these standard supports during microwave drying, e.g. in a microwave oven, particularly if the wet glass fibre forming packages are required to be exposed to elevated temperatures, e.g. in a hot air oven, following microwave drying, for example to cure the dried sizing composition.

Firstly, it was investigated whether conventional supports can be used to support wet glass fibre forming packages during microwave drying. It has been found that although non-magnetic metal supports can be used at conventional microwave drying frequencies of around 2.45 GHZ, magnetic supports cannot be used for conventional microwave drying. Surprisingly the present inventors have found that all metal supports, i.e. including magnetic metal supports, can be employed for microwave drying using a microwave frequency in the range of about 750 to about 1050 MHZ, e.g. 915 MHz.

The present inventors have also found that employing microwave radiation having a frequency in the range of about 750 to about 1050 MHZ, e.g. 915 MHz, provides deeper penetration into the wet glass fibre forming packages than microwave radiation having a frequency of about 2.45 GHz which advantageously provides more homogenous drying of the sized glass fibres.

Microwave Drying of Combinations of Partial and Full Wet Glass Forming Packages

The present inventors investigated whether microwave drying using a frequency of about 915 MHz could be used to successfully dry a number of wet glass fibre forming packages containing different amounts of glass fibres. Two wet glass fibre forming packages according to Example 3 were provided. One of the wet glass fibre forming package had an initial (i.e. undried) weight of 25 kg (full forming package), the other had an initial weight of 20 kg (partial forming package). The two wet glass fibre forming packages were placed in a microwave drier together and subjected to microwave radiation having a frequency of about 915 MHz and a power of about 130 W/kg wet glass fibre forming package. The initial moisture content of both the full and partial forming packages was about 9.5% which reduced to less than 0.1% after microwave drying for just over 1 hour 30 mins. These results are provided in Table 2 below.

TABLE 2

| | Full wet glass fibre forming package | Partial wet glass fibre forming package |
|---|---|---|
| Initial weight (kg) | 25.295 | 20.885 |
| Total moisture (%) | 9.51 | 9.58 |
| Residual moisture after MW drying (%) | 0.07 | 0.08 |

Figure 2:
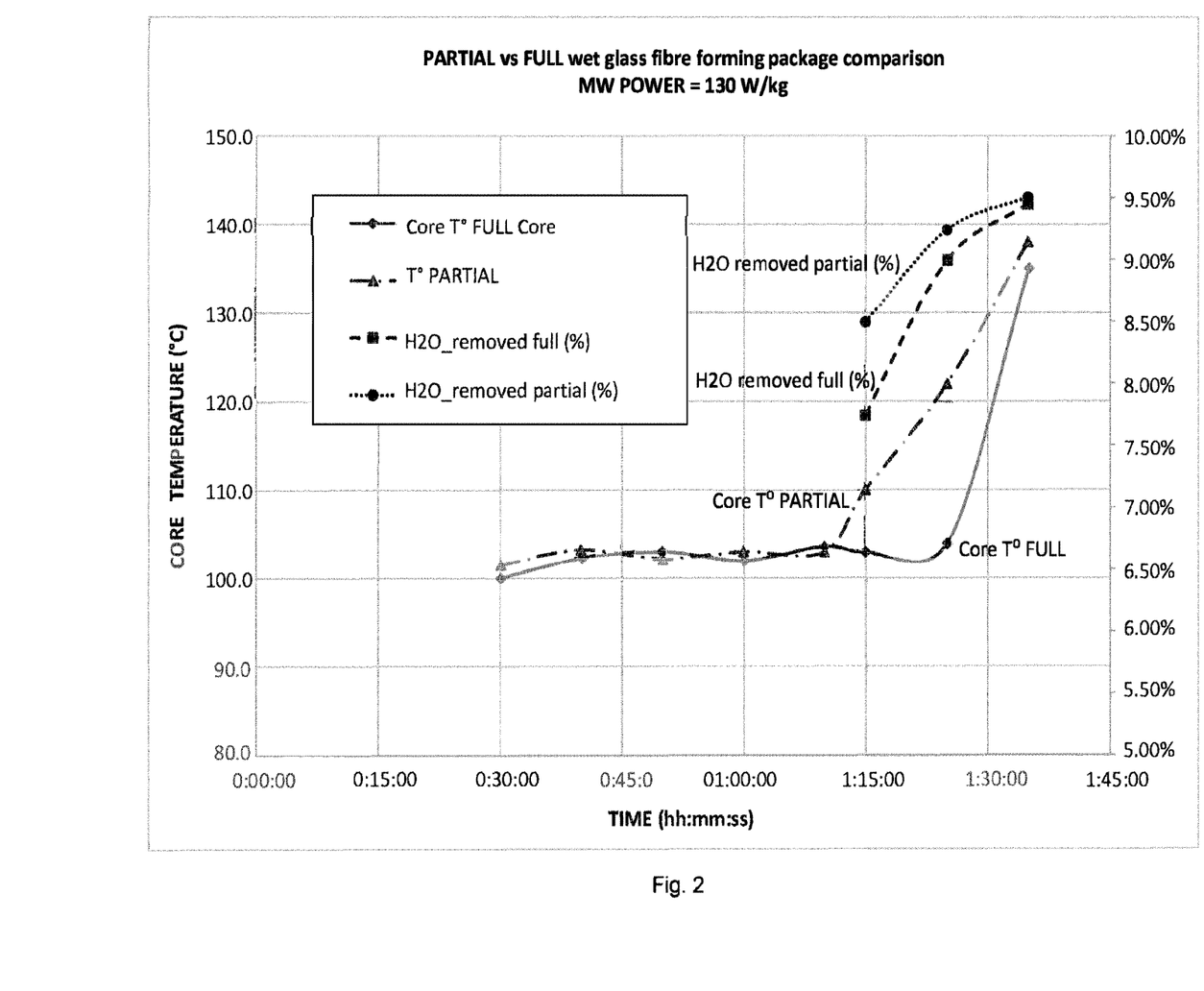
FIG. 2 is a graph showing the core temperature of a full wet glass fibre forming package and a partial wet glass fibre forming package subjected to microwave radiation having a frequency of 915 MHz and power of 130 W/kg wet glass fibre forming package over time and the percentage of moisture removal by the total initial weight of the wet glass fibre forming packages over time.
Figure 4:
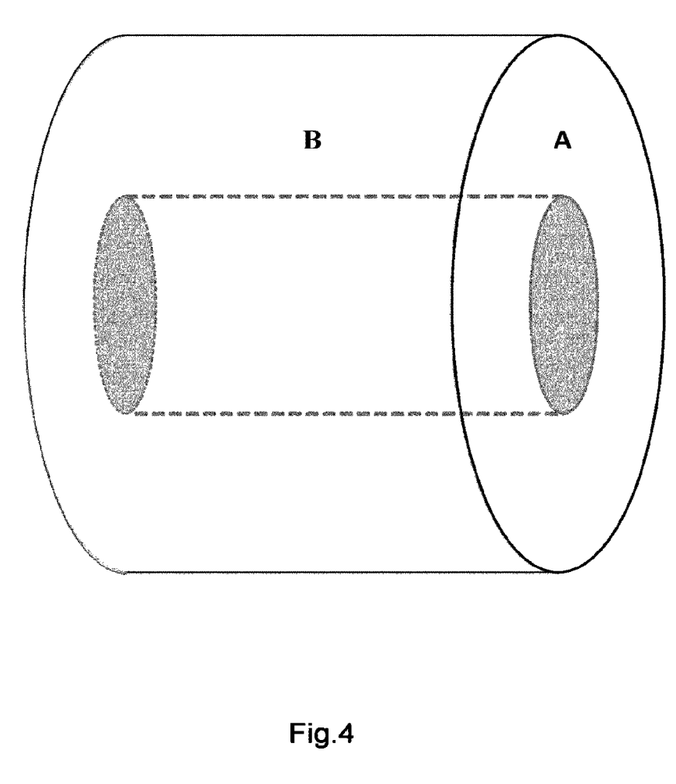
FIG. 4 is a schematic diagram of a glass fibre forming package.

FIG. 2 shows the temperature elevation of the glass fibre forming packages (core temperature, i.e. temperature at the core of the glass fibre forming package, for example at a point such as that indicated at point B in FIG. 4) and the percentage of moisture removal by the total initial weight of the wet glass fibre forming packages over time. As can be seen from FIG. 1, the core temperature of the partial forming package increased beyond 100° C. before that of the full forming package. However, as can be seen from FIG. 1, it was found that both forming packages dried completely simultaneously with a core temperature in the 130-140° C. range (the temperature elevation of the partial forming package increasing from around 100° C. to the final core temperature (in the 130-140° C. range) being around 1.4° C./min, and that of the full forming package being around 3.1° C./min). Therefore, it can be seen that microwave drying is suitable for drying mixed weights of wet glass fibre forming packages.

Comparison of Hot Air Drying and Microwave Drying of Wet Glass Fibre Forming Packages The effect of drying wet glass fibre forming packages according to Examples 1-6 in hot air alone using a conventional hot air oven and by drying using microwave radiation having a frequency of about 915 MHz was investigated. In these tests, wet glass fibres forming packages of Examples 1-6 were dried using hot air only, or dried using microwave radiation having a frequency of about 915 MHz.

Wet glass fibre forming packages according to Examples 1-6 were dried by subjecting the wet glass fibre forming packages to microwave radiation having a frequency of about 915 MHz. Different powers of microwave radiation was used to investigate the impact on drying time as well as impact on glass fibre elongation, dissymmetry and ovalization compared to drying the same wet glass fibre forming packages using hot air only. Table 3 below shows the approximate drying time for wet glass fibre forming packages of Examples 1-6 at different microwave powers.

TABLE 3

| | Microwave power normalised per kg of wet glass fibre forming package (W/kg) | | | |
|---|---|---|---|---|
| | <50 | 50-100 | 100-150 | >150 |
| Drying time | >3 hours | ~2 hours | ~1 hour | <1 hour |

It was found that employing a microwave power of about 50 W/kg provided the largest improvements in glass fibre elongation, dissymmetry and ovalization compared to drying the same wet glass fibre forming packages using hot air only and resulted in a drying time of about 3 hours. It is noted that drying the same forming packages using hot air at 130° C. only, i.e. no microwave radiation, takes about 12 hours. This difference in drying time can be seen from FIG. 3 which is a graph showing the oven temperature in which the wet glass fibre forming package is placed for drying and curing (for example an oven configured to subject the wet glass fibre forming package to microwave radiation and/or elevated temperature using hot air) of a wet glass fibre forming package against time.

It was also found that the wet glass fibre forming packages dried by microwave radiation do not show yellowing, or show far less yellowing than the equivalent wet glass fibre forming packages dried in hot air.

In order to cure the dried sizing composition applied to the glass fibres of the glass fibre forming packages of Examples 1-6, the glass fibre forming packages of Examples 1-6 were subjected to a curing step immediately following the drying by microwave radiation (or hot air (130° C.) as described above. The curing step for all glass fibre forming packages, i.e. however the glass fibre forming packages were dried, involved subjecting to hot air drying in a hot air oven at a temperature of about 130° C. for about 9.5 hours.

Figure 3:
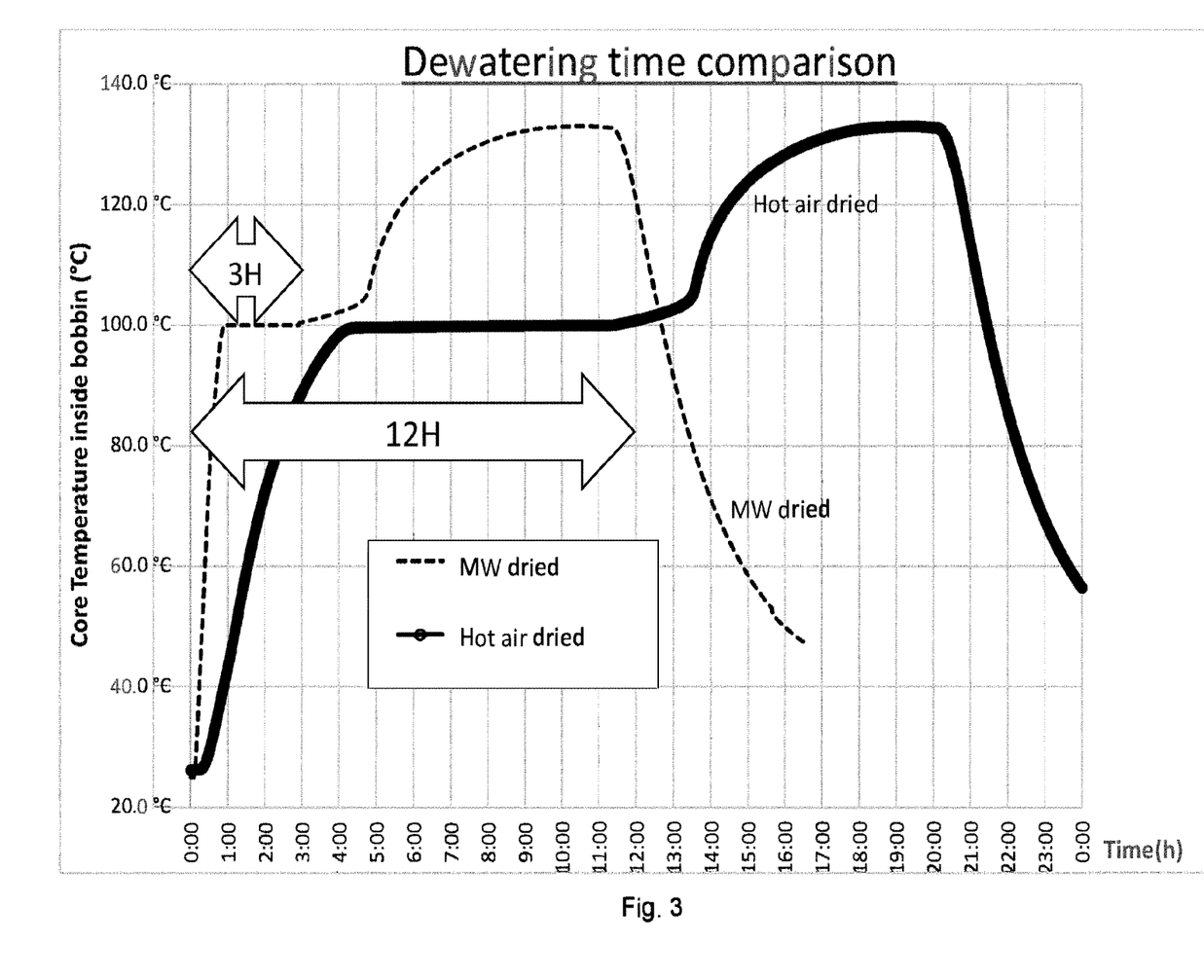
FIG. 3 is a graph showing oven temperature against time during the drying and curing of wet glass fibre forming packages.

As can be seen from FIG. 3, the total drying and curing time for a wet glass fibre forming package according to Example 3 dried using microwave radiation (power 50 W/kg) is far less than the combined drying and curing time when a wet glass fibre forming package according to Example 3 is exposed to hot air alone (for both drying and curing). Therefore, by subjecting the wet glass fibre forming packages to microwave radiation as described herein, the production capacity of a wet glass fibre forming package production facility can be greatly increased.

The glass fibre forming package coloration was also determined for the glass fibre forming packages after drying and curing. The results are shown below in table 4. The values provided in table 4 below for yellow coloration are b+ index values from CIE Lab (see https://www.xrite.com/blog/lab-color-space) for each of the samples which were determined using a colorimeter.

TABLE 4

| Glass Fibre Forming package | Glass fibre forming package yellow coloration (indB) | | | | |
|---|---|---|---|---|---|
| | Dry and cure with hot air (comparative) | MW (at power/kg indicated below) dry and hot air cure | | | |
| | | <50 W/kg | 50-100 W/kg | 100-150 W/kg | >150 W/kg |
| Example 1 | 9.1 | | 8.8 | 9.3 | 8.8 |
| Example 2 | 4.8 | 2.4 | 2.4 | 2.3 | |
| Example 3 | 5.1 | 3.86 | | | |
| Example 4 | 6.5 | 3.7 | 3.3 | 3.1 | 3.1 |
| Example 5 | 7.3 | 7.9 | 9.7 | 10.2 | |
| Example 6 | 8.9 | 7 | 6.8 | 7.2 | |

As can be seen from table 4, subjecting the wet glass fibre forming packages to microwave radiation generally decreases yellowing of the glass fibre forming packages even when the microwave dried glass fibre forming packages are subjected to hot air curing following microwave drying. It is noted that for Example 1 and Example 5, the colouration was measured as being around 3 following the microwave drying, so the increase in coloration was largely due to the hot air curing step which followed microwave drying.

The migration index was also determined for the glass fibre forming packages to determine the homogeneity of the sizing composition on the glass fibres after the drying and curing steps. The migration index was calculated as the ratio of the LOI measured at the turnaround point at the outer edge (shown as point A in FIG. 4) of the glass fibre forming package to the LOI measured in the core of the glass fibre forming package (a point between the two outer edges of the glass fibre forming package, e.g. point B in FIG. 4), where the LOI is calculated according to ISO 1887: 2014 (% LOI=$(P_1-P_2)/P_1$, where $P_1$ is the sample weight (g) after drying at 105° C.±2° C., and $P_2$ is the sample weight (g) after burning at 625° C.±2° C.] The migration index as determined for each of the glass fibre forming packages is shown in table 5 below.

TABLE 5

| Glass Fibre Forming package | Migration index | | | |
|---|---|---|---|---|
| | Dry and cure with hot air (comparative) | MW (at power/kg indicated below) dry and hot air cure | | |
| | | <50 W/kg | 50-100 W/kg | 100-150 W/kg |
| Example 1 | 1.88 | | 1.02 | 1.31 |
| Example 2 | 1.75 | | 1.25 | 1.12 |
| Example 3 | 1.53 | 1.35 | | |
| Example 4 | 2.49 | | 1.3 | 1.30 |
| Example 5 | 3.12 | | | 1.17 |
| Example 6 | 1.16 | 1.17 | | |

As can be seen from table 5, subjecting the wet glass fibre forming packages to microwave radiation provides at least similar, but for most examples much improved migration index (and therefore improved homogeneity of the sizing composition) compared to wet glass fibre forming packages dried by hot air.

Due to the improvements in coloration and migration index achieved by subjecting wet glass fibre forming packages to microwave radiation as described herein, employing the process described herein will also reduce waste in terms of the amount of glass fibre strands not meeting particular requirements for colouration and/or migration index.

The dried and cured glass fibre forming packages were also tested in a full unwinding test to determine the fuzz level. It was found that each of the wet glass fibre forming packages dried by microwave radiation provide an acceptable fuzz level.

Mechanical Properties

Composite plate samples were produced using dried glass fibre strands from a number of the dried and cured glass fibre forming packages described above and a resin. The glass fibre weight fraction in the composite plate samples was determined according to ISO 1172. These composite plate samples were then tested for mechanical performance using the 3 point bending test described in ISO 14125 or ISO 178 as discussed below. The Composite plate samples tested are described in table 6 below and were provided with dimensions as described in ISO 14125 or ISO 178.

Composite plate samples prepared by a method of filament "winding and infusion" were prepared by winding a dried glass fibre strand from a dried glass fibre forming package around two baffles having the appropriate size and spacing between. Once the desired amount of glass fibre strand was wound round the baffles, the sheet of winding (removed from the baffles) was placed between hardboard sheets in a vacuum bag. A vacuum was then applied to the vacuum bag to remove air. Once the vacuum was stopped, a nozzle to supply resin was attached to the vacuum bag. Resin was then released to infuse into the glass fibre mat in the vacuum bag as the vacuum pump was switched back on. The resin was cured. The glass fibre mat infused with resin was then removed from the vacuum bag and from between the hardboard sheets Composite plate samples prepared by a method of "impregnated filament winding" were prepared by immersing a dried glass fibre strand from a dried glass fibre forming package in resin before winding the resin impregnated glass fibre strand around a mandrel to form the desired shape (i.e. according to ISO 14125) and then cured (the mandrel is removed before testing).

Composite plate samples prepared by a method of "extrusion and injection" were prepared by extruding a mixture of chopped dried glass fibre strands from a dried glass fibre forming package and resin which was injected into a mould having appropriate dimensions (i.e. according ISO 178) and cured.

TABLE 6

| Composite Plate Sample | Glass fibre forming package employed | Drying and curing of glass fibre forming package | Glass fibre weight fraction in composite plate sample | Composite plate sample preparation method | Resin |
|---|---|---|---|---|---|
| Example 7 | Ex. 4 | 3 hours MW drying (50 W/kg) + 9.5 hrs hot air curing (130° C.) | 75 wt. % | Filament winding and infusion | Epoxy resin (EPIKOTE MGS_RIMR_135) |
| Comparative Example 8 | Ex. 4 | 23 hours hot air drying and curing (130° C.) | 75 wt. % | Filament winding and infusion | Epoxy resin (EPIKOTE MGS_RIMR_135) |
| Example 9 | Ex. 3 | 3 hours MW drying (50 W/kg) + 9.5 hrs hot air curing (130° C.) | 71.5 wt. % | Impregnated Filament Winding | Polyester resin (POLYESTER DION 31045-10) |
| Comparative Example 10 | Ex. 3 | 23 hours hot air drying and curing (130° C.) | 71.5 wt. % | Impregnated Filament Winding | Polyester resin (POLYESTER DION 31045-10) |
| Example 11 | Ex. 1 | 3 hours MW drying (50 W/kg) + 9.5 hrs hot air curing (130° C.) | 30.0 wt. % | Extrusion + Injection | Polypropylene resin (POLYPRO HD120MO) |
| Comparative Example 12 | Ex. 1 | 23 hours hot air drying and curing (130° C.) | 30.0 wt. % | Extrusion + Injection | Polypropylene resin (POLYPRO HD120MO) |

The composite plate samples of Examples 7 and 9 and Comparative Examples 8 and 10 were tested as produced according to table 6, or following a further hot water ageing step (testing after submersion in boiling water, i.e. water at 100° C., for 24 hours), to determine the stress at break, strain at break and the flexural modulus of the composite plate samples according to ISO 14125 as set out in table 7 below. The results are shown in table 7 below.

TABLE 7

| Composite plate sample | Underwent 24 hours hot water ageing prior to testing? | Stress at break, MPa (ISO 14125) | Strain at break, % (ISO 14125) | Flexural Modulus, MPa (ISO 14125) |
|---|---|---|---|---|
| Example 7 | No | 1345 | 4.216 | 27709 |
| Comparative Example 8 | No | 1141 | 3.716 | 27425 |
| Example 9 | No | 1543 | 4.188 | 33614 |
| Comparative Example 10 | No | 1289 | 3.596 | 33762 |
| Example 9 | Yes | 1468 | 4.018 | 34135 |
| Comparative Example 10 | Yes | 1210 | 3.438 | 33689 |

Therefore, the present inventors have also found that the method of the present invention also provides improvements in mechanical properties of the dried glass fibre products produced. In particular, it has been found that the method of the present invention provides dried glass fibre forming packages providing dried glass fibre strands which may be incorporated into composite materials, e.g. using a filament winding process (see for example Examples 7 and 9 described above), and provide, for example, around a 20% increase in strength at failure compared to composite materials containing glass fibres from corresponding wet glass fibre forming packages dried using conventional hot air techniques. The improved mechanical properties observed for these samples appears to be linked to the improved homogeneity of the dried glass fibres.

The composite plate samples of Example 11 and Comparative Example 12 were tested as produced according to table 6, to determine the stress at break, strain at break and the flexural modulus of the composite plate samples according to ISO 178 as set out in table 8 below. Samples 1 and 2 of Example 11 and Comparative Example 12 refer to repeat examples (i.e. sample 1 of each example was formed before sample 2 using the same procedure outlined in table 6).

TABLE 8

| Composite plate sample | Stress at break, MPa (ISO 178) | Strain at break, % (ISO 178) | Flexural Modulus, MPa (ISO 178) |
|---|---|---|---|
| Example 11-sample 1 | 135.0 | 3.75 | 5828 |
| Example 11-sample 2 | 135.3 | 3.77 | 5835 |
| Comparative Example 12-sample 1 | 128.7 | 3.35 | 5816 |
| Comparative Example 12-sample 2 | 135.8 | 3.87 | 5778 |

From the results provided in table 8 (results for samples prepared by the "extrusion and injection" method), it can be seen that sample 2 of Comparative Example 12 exhibits similar mechanical properties to samples 1 and 2 of Example 11.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A wet glass fiber forming package processing system, the system comprising:
   a glass fiber producing apparatus comprising a bushing for extruding glass fibers;
   an aqueous sizing applicator for applying an aqueous sizing to the glass fibers extruded from the bushing to form sized glass fibers;
   a strand forming device for forming a glass fiber strand from the sized glass fibers;
   a winding device for forming a wet glass fiber forming package from the glass fiber strand;
   a magnetic metal support for supporting the wet glass fiber forming package; and
   a microwave drier configured to dry the wet glass fiber forming package on the support to form a dried glass fiber forming package by subjecting the wet glass fiber forming package to microwave radiation having a frequency in the range of about 750 MHz to about 1,050 MHz.

2. The system according to claim 1, further comprising an oven for subjecting the dried glass fiber forming package to an elevated temperature to cure the glass fiber forming package.

3. The system according to claim 2, wherein the elevated temperature is in the range of about 50° C. to about 150° C.

4. The system according to claim 2, wherein the dried glass fiber forming package is subjected to the elevated temperature for at least about 5 hours.

5. The system according to claim 1, wherein the microwave radiation frequency has a range of about 800 MHz to about 1,000 MHz.

6. The system according to claim 1, wherein the wet glass fiber forming package is subjected to the microwave radiation for at least about 30 mins.

7. The system according to claim 1, wherein the wet glass fiber forming package is subjected to the microwave radiation for up to about 5 hours.

8. The system according to claim 1, wherein the microwave radiation to which the wet glass fiber forming package is subjected has a power of at least about 10 W/kg of wet glass fiber forming package.

9. The system according to claim 1, wherein the microwave radiation to which the wet glass fiber forming package is subjected has a power of up to about 150 W/kg of wet glass fiber forming package.

10. The system according to claim 1, wherein the wet glass fiber forming package has a mass in the range of about 10 kg to about 50 kg.

11. The system according to claim 1, wherein the wet glass fiber forming package has a cylindrical shape and an internal diameter in the range of about 5 cm to about 20 cm.

12. The system according to claim 1, wherein the wet glass fiber forming package has a cylindrical shape and an external diameter in the range of about 20 cm to about 60 cm.

* * * * *